United States Patent Office 3,573,323
Patented Mar. 30, 1971

3,573,323
1,2,3,4,5,10-HEXAHYDROAZEPINO[2,3-b]INDOLES
Jackson B. Hester, Jr., Portage, Mich., assignor to The Upjohn Company, Kalamazoo, Mich.
No Drawing. Filed Feb. 28, 1969, Ser. No. 803,449
Int. Cl. C07d 27/36
U.S. Cl. 260—326.5    9 Claims

ABSTRACT OF THE DISCLOSURE

New 1,2,3,4,5,10 - hexahydroazepino[2,3-b]indoles of the formula:

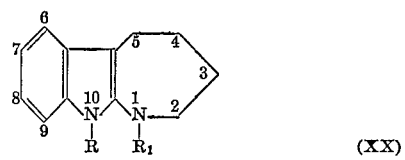

(XX)

wherein R is selected from the group consisting of hydrogen, methyl, ethyl and acetyl and wherein $R_1$ is selected from the group consisting of ethyl and acetyl with the proviso that when R is hydrogen, $R_1$ is acetyl, are prepared. These compounds and the pharmacologically acceptable acid addition salts when in the amino form have sedative action and can be used in mammals and birds as tranquilizers.

BACKGROUND OF THE INVENTION

Field of the invention

The present invention is concerned with new organic compounds and more particularly with novel 1,2,3,4,5,10-hexahydroazepino[2,3-b]indoles and their acid addition salts, intermediates and processes of production thereof.

The processes of production for the compounds of the present invention can be illustratively represented as follows:

Method A

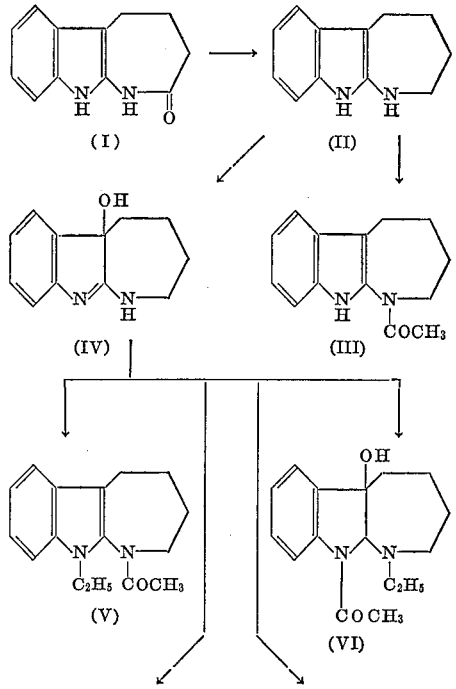

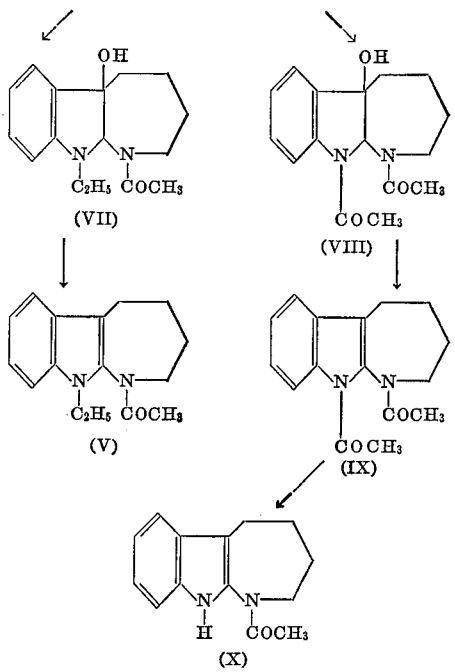

Method B

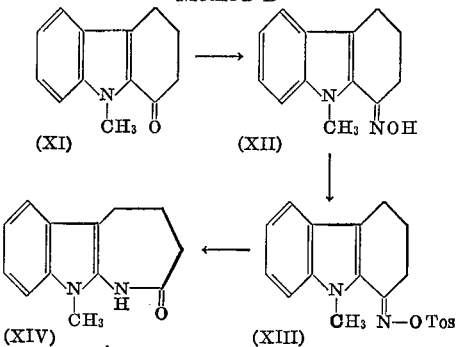

Tos=Toluenesulfonyl

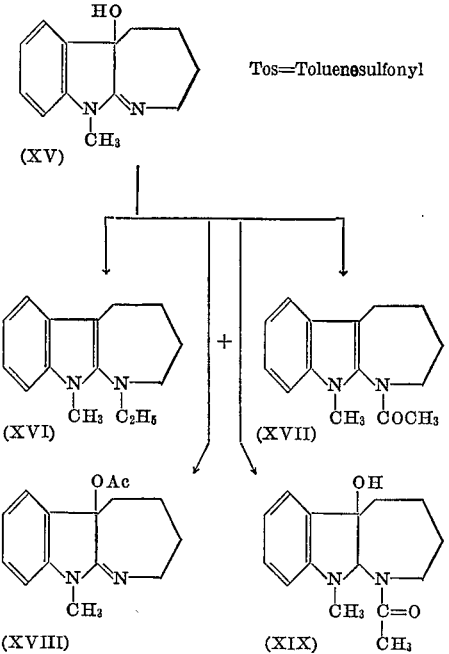

The important products of this invention can be represented by the formula XX:

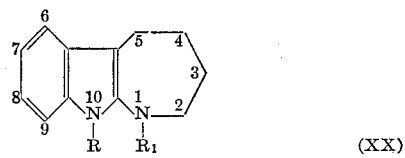

wherein R is selected from the group consisting of hydrogen, methyl, ethyl and acetyl and wherein $R_1$ is selected from the group consisting of ethyl and acetyl with the proviso that R is hydrogen only, if $R_1$ is acetyl.

Method A of this invention comprises the following steps: reducing 3,4,5,10 - tetrahydroazepino[2,3-b]indole-2(1H)one (I) (Belgian Pat. No. 705,424) with lithium aluminum hydride to obtain II and treating II with acetic anhydride to give 1-acetyl-1,2,3,4,5,10-hexahydroazepino [2,3-b]indole (III); treating I with lithium aluminum hydride in tetrahydrofuran yields, after air oxidation, 2,3,4,5-tetrahydroazepino[2,3-b]indol - 5a(1H) - ol (IV); hydrogenating IV in acetic anhydride in the presence of a palladium on charcoal catalyst yielded:

1-acetyl-10-ethyl-1,2,3,4,5,10-hexahydroazepino
 [2,3-b]indole (V);
10-acetyl-1-ethyl-2,3,4,5,10,10a-hexahydroazepino
 [2,3-b]indol-5a(1H)-ol (VI);
1-acetyl-10-ethyl-2,3,4,5,10,10a-hexahydroazepino
 [2,3-b]indol-5a(1H)-ol (VII); and
1,10-diacetyl-2,3,4,5,10,10a-hexahydroazepino
 [2,3-b]indol-5a(1H)-ol (VIII);

treating compound VIII with p-toluenesulfonic acid at a temperature between 25–120° C. yielded 1,10-diacetyl-1,2,3,4,5,10 - hexahydroazepino[2,3-b]indole (IX); and treating VII with p-toluenesulfonic acid yielded 1-acetyl-10-ethyl-1,2,3,4,5,10-hexahydroazepino[2,3-b]indole (V). Treating 1,10 - diacetyl - 1,2,3,4,5,10-hexahydroazepino [2,3-b]indole (IX) with sodium in ethanol produces 1-acetyl-1,2,3,4,5,10 - hexahydroazepino[2,3-b]indole (X).

Method B comprises treating 3,4-dihydro-9-methylcarbazol-1(2H)-one (XI) (produced from 3,4-dihydrocarbazol-1(2H)-one with methyl sulfate) with a hydroxylamine salt in the presence of a base to obtain the corresponding oxime (XII) which is reacted with p-toluenesulfonyl chloride to produce 3,4-dihydro-9-methylcarbazol-1(2H)-one oxime p-toluenesulfonate (XIII); compound XIII by absorption on a column of deactivated neutral alumina is converted to 3,4,5,10-tetrahydro-10-methylazepino[2,3-b]indole-2(1H)-one (XIV); compound XIV when reduced with lithium aluminum hydride and after being permitted to stand in air, yielded 3,4,5,10-tetrahydro - 10-methylazepino[2,3-b]indol-5a(2H)-ol (XV), hydrogenating Compound XV in the presence of a palladium on charcoal catalyst in acetic anhydride gave:

1-ethyl-1,2,3,4,5,10-hexahydro-10-methylazepino
 [2,3-b]indole (XVI);
1-acetyl-1,2,3,4,5,10-hexahydro-10-methylazepino
 [2,3-b]indole (XVII);
3,4,5,10-tetrahydro-10-methylazepino[2,3-b]indole-
 5a(2H)-ol acetate (XVIII);
1-acetyl-2,3,4,5,10,10a-hexahydro-10-methylazepino
 [2,3-b]indol-5a(1H)-ol (XIX).

DESCRIPTION OF THE PREFERRED EMBODIMENT

The novel compounds of Formula XX including acid addition salts of the amino compounds have sedative and tranquilizing effects in mammals and birds.

The acid addition salts of compounds of Formula XX, contemplated in this invention, are the hydrochlorides, hydrobromides, hydroiodides, sulfates, phosphates, acetates, lactates, tartrates, citrates, salicylates, succinates, malates, maleates, pamoates, cyclohexanesulfamates, methanesulfonates and the like, prepared by reacting a compound of Formula XX wherein $R_1$ is alkyl as defined above with the stoichiometrically calculated amount of the selected pharmacologically acceptable acid.

Sedative effects of 1-ethyl-1,2,3,4,5,10-hexahydro-10-methylazinepino[2,3-b]indole as hydrochloride is shown by the following tests in mice:

Chimney test [Med. Exp. 4, 11 (1961)]: The effective intraperitoneal dosage for 50% of mice ($ED_{50}$) is 75 mg./kg. The test determines the ability of mice to back up and out of a vertical glass cylinder within 30 seconds. At the effective dosage, 50% of the mice failed doing it.

Dish test: Mice in Petri dishes (10 cm. diameter, 5 cm. high, partially embedded in wood shavings) climb out in a very short time when not treated. When mice remain in the dish for more than 3 minutes. It indicates tranquilization. $ED_{50}$ equals the dose of test compound at which 50% of the mice remain in the dish. The $ED_{50}$ (intraperitoneal administration) in this test was 45 mg./kg.

Pedestal test: The untreated mouse leaves the pedestal in less than a minute to climb back to the floor of the standard mouse box. Tranquilized mice will stay more than 1 minute. $ED_{50}$ (intraperitoneal administration) was 40 mg./kg.

Nicotine antagonism test: Mice in groups of 6 are injected with ethyl - 1,2,3,4,5,10 - hexahydro-10-methylazepino[2,3-b]indole hydrochloride. Thirty minutes later the mice including control (untreated) mice are injected with 2 mg./kg. nicotine salicylate. The control mice show overstimulation, i.e., (1) running convulsion followed by (2) tonic extensor fits; followed by (3) death. A dosage of 72 mg./kg. protected 50% of the mice against (2) and (3) ($ED_{50}$).

The pharmaceutical forms contemplated by this invention include pharmaceutical compositions suited for oral, parenteral and rectal use, e.g., ointment, lotions, tablets, oils, powder packets, cachets, dragées, capsules, solutions, suspensions, sterile injectible forms, suppositories, bougies and the like. Suitable diluents or carriers such as carbohydrates (lactose) proteins, lipids, calcium phosphate, cornstarch, stearic acid, methylcellulose and the like may be used as carriers or for coating purposes. Oil, e.g., coconut oil, sesame oil, safflower oil, cottonseed oil, peanut oil may be used for preparing solutions or suspensions of the active drug. Sweetening, coloring and flavoring agents may be added.

For mammals and birds food premixes, with starch, oatmeal, dried fishmeat, fishmeal, flour and the like can be prepared.

As tranquilizer the compounds of Formula XX can be used in dosages of 5–100 mg./kg. in oral or injectable preparations as described above, to alleviate tension and anxiety in mammals or birds, such as e.g., occurs when animals are in travel.

Other acid addition salts of the amine compounds of Formula XX can be made such as the fluosilicic acid addition salts which are useful mothproofing compounds or the trichloroacetates useful as herbicides against Johnson grass, Bermuda grass, yellow foxtail and green foxtail, and quack grass.

In carrying out the process of the present invention according to Method A, 3,4,5,10-tetrahydroazepino[2,3-b] indol-2(1H)-one (I) was reduced with lithium aluminum hydride in an inert organic solvent such as tetrahydrofuran, ether, benzene or mixtures thereof. The lithium aluminum hydride is generally used in a large excess, such as from 2 to 10 times the amount stoichiometrically required. After all of the lithium aluminum hydride has been added, the mixture is refluxed from 2 to 24 hours and decomposed with water and a base such as aqueous sodium hydroxide. After filtration to remove solid particles, the filtrate contains 1,2,3,4,5,10-hexahydroazepino [2,3-b]indole, which is acetylated without isolation. For this purpose, the filtrate is treated with pyridine and excess acetic anhydride, then concentrated in vacuo and the product purified by conventional procedures such as recrystallization, extraction or chromatography to give 1 - acetyl - 1,2,3,4,5,10 - hexahydroazepino[2,3-b]indole (III).

In the same manner, reducing 3,4,5,10-tetrahydroazepino[2,3-b]indol-2(1H)-on with lithium aluminum hydride, decomposing the reaction mixture and filtering and then stirring the thus-produced Compound II in air for 1 to 4 days produces 2,3,4,5-tetrahydroazepino[2,3-b]indol-5a(1H)-ol (IV). The thus-produced compound IV is isolated and purified in conventional manner, such as evaporating the solvent and crystallizing the product using additional crystallization, chromatography or extraction to obtain the pure product of Formula IV.

Compound IV is hydrogenated in the presence of a palladium-on-carbon catalyst and in acetic anhydride suspension. In the preferred embodiment of this invention, 2,3,4,5 - tetrahydroazepino[2,3-b]indol - 5a(1H) - ol with about half of the amount by weight of 10% palladium-on-carbon catalyst and about 25–150 ml. of acetic anhydride per gram is hydrogenated for a period of 4 to 12 hours at 20 to 60 p.s.i. hydrogen pressure. Four products are obtained, namely:

1-acetyl-10-ethyl-1,2,3,4,5,10-hexahydroazepino [2,3-b]indole;
10-acetyl-1-ethyl-2,3,4,5,10,10a-hexahydroazepino [2,3-b]indol-5a-(1H)-ol;
1-acetyl-10-ethyl-2,3,4,5,10,10a-hexahydroazepino [2,3-b]indol-5a(1H)-ol;
1,10-diacetyl-2,3,4,5,10,10a-hexahydroazepino [2,3-b]indol-5a(1H)-ol.

These products are separated from each other by chromatography, using ethyl acetate and Skellysolve B hexanes as eluents.

Heating 1 - acetyl - 10 - ethyl-2,3,4,5,10,10a-hexahydroazepino[2,3-b]indol - 5a(1H) - ol with p-toluenesulfonic acid in an organic solvent such as benzene, cyclohexane or the like in a nitrogen atmosphere between 70–110° C. at respectively the reflux temperature of the mixture produces 1-acetyl - 10 - ethyl - 1,2,3,4,5,10-hexahydroazepino [2,3-b]indole. In the preferred embodiment, the heating is between 15 and 60 minutes and at the termination of the heating, the mixture is poured into ice water and extracted with an organic solvent such as ether, benzene, cyclohexane, methylene chloride or the like. Evaporation of the extracts and recrystallization of the product gave pure 1 - acetyl - 10 - ethyl - 1,2,3,4,5,10-hexahydroazepino [2,3-b]indole.

In the same manner, treating 1,10-diacetyl-2,3,4,5,10, 10a - hexahydroazepino[2,3-b]indol - 5a(1H)-ol with p-toluenesulfonic acid in benzene yields 1,10-diacetyl-1,2,3 4,5,10-hexahydroazepino[2,3-b]indole.

In carrying out the process of Method B, 3,4-dihydro-9-methylcarbazol-1(2H)-one is refluxed with hydroxylamine hydrochloride and anhydrous sodium acetate, water and ethanol for a period between 12 to 24 hours. After the reaction is terminated and the reaction mixture cooled, crystalline 3,4-dihydro-9-methylcarbazol-1-(2H)-one oxime (XII) precipitates from the mixture and can be recovered by filtration. The thus-obtained oxime (XII) is treated with p-toluenesulfonyl chloride in pyridine. The mixture is allowed to stand at room temperature for between 1 to 6 days and the product 3,4-dihydro-9-methylcarbazol - 1(2H) - one oxime p-toluenesulfonate is recovered by filtration and may be purified by conventional procedures such as recrystallization.

The thus-obtained toluenesulfonate of Formula XIII is treated with neutral alumina which had been deactivated by the addition of a small amount of water, 0.2 to 0.5% by weight of the alumina, and the product is obtained by eluting the column, usually used to contain the alumina, with mixtures of methanol and chloroform. The product, 3,4,5,10 - tetrahydro - 10 - methylazepino [2,3-b]indol - 2(1H) - one, can be further purified by chromatography or recrystallization.

The thus-obtained 3,4,5,10 - tetrahydro - 10 - methylazepino[2,3-b]indol-2(1H)-one by treatment with lithium aluminum hydride and subsequently exposure to air is converted to 3,4,5,10 - tetrahydro - 10 - methylazepino [2,3-b]indol-5a(2H)-ol in the same manner as given above.

By hydrogenating this product (XV) in the presence of a 10% palladium-on-carbon catalyst and in a solution or mixture of acetic anhydride produces four products which are separated by chromatography and are 1-ethyl-1,2,3,4,5,10-hexahydro-10-methylazepino [2,3-b]indole isolated as hydrochloride;
1-acetyl-1,2,3,4,5,10-hexahydro-10-methylazepino [2,3-b] indole;
3,4,5,10-tetrahydro-10-methylazepino[2,3-b]indol-5a(2H)-ol acetate;
1-acetyl-2,3,4,5,10,10a-hexahydro-10-methylazepino [2,3-b]indol-5a(1H)-ol.

The following examples are illustrative of the process and products of the present invention, but are not to be construed as limiting.

EXAMPLE 1

*1-acetyl-1,2,3,4,5,10-hexahydroazepino[2,3-b]indole*

3,4,5,10 - tetrahydroazepino[2,3 - b]indol - 2(1H)-one (5.05 g., 0.0252 mole) was added, under nitrogen, to an ice cold, stirred suspension of lithium aluminum hydride (5.0 g.) in tetrahydrofuran (350 ml.). The resulting mixture was refluxed for 18 hours, cooled in an ice bath and treated successively with water (5 ml.), 15% aqueous sodium hydroxide (5 ml.) and water (15 ml.). This mixture was stirred under nitrogen for 1 hour and filtered. The filtrate was treated with pyridine (100 ml.) and acetic anhydride (10 ml.) and concentrated to a volume of 100 ml. in vacuo. This solution was treated with additional acetic anhydride (10 ml.), kept under nitrogen at ambient temperature for 18 hours and concentrated in vacuo to give a residue. The residue was stirred with water for several hours, and the resulting crystalline product was collected by filtration, washed with water, dried and recrystallized from ethyl acetate to give 1.55 g. (26.9%) of 1-acetyl-1,2, 3,4,5,10-hexahydroazepino[2,3-b]indole of melting point 194.5–196.5° C. A small second crop, 0.121 g. of melting point 193.5–194.5° C., was obtained by concentrating the mother liquor. The analytical sample of melting point 193° C., was prepared by recrystallizing some of this material from ethyl acetate.

U.V.: λ max. 223, 285 and 289.5 m$\mu$ ($\epsilon$ 37,050, 8800 and 8400 respectively) with an infection at 275 m$\mu$ ($\epsilon$ 9350).

*Analysis.*—Calcd. for $C_{14}H_{16}N_2O$ (percent): C, 73.65; H, 7.06; N, 12.27. Found (percent): C, 73.39; H, 7.14; N, 12.37.

EXAMPLE 2

*2,3,4,5-tetrahydroazepino[2,3-b]indol-5a(1H)-ol, its hydrochloride and hydrobromide*

3,4,5,10 - tetrahydroazepino[2,3 - b]indol - 2(1H) - one (12.7 g., 0.0634 mole) was added, under nitrogen, to an ice cold, stirred suspension of lithium aluminum hydride (13 g.) in tetrahydrofuran (1300 ml.). The resulting mixture was refluxed for 15 hours, cooled in an ice bath and treated successively with water (13 ml.), 15% aqueous sodium hydroxide solution (13 ml.) and water (39 ml.). This mixture was stirred for a few minutes and filtered. The filtrate was concentrated in vacuo to give a residue. A solution of the residue in methanol was stored at 0° C. for 2 days and crystallized to give 4.80 g. of melting point 252.5–253.5° C. (dec.); 2.99 g. of melting point 248.5–250° C. (dec.) and 1.30 g. of melting point 247–248.5° C. (dec.) (70.8% yield) of 2,3,4,5-tetrahydroazepino[2,3-b] indol-5a(1H)-ol. The analytical sample of melting point 255–259.5° C., was prepared by recrystallizing this material from methanol.

U.V.: λ max. 223, 280, 290 and 319 mμ (ε 23,060; 10,030; 9270 and 4300 respectively).

*Analysis.*—Calcd. for $C_{12}H_{14}N_2O$ (percent): C, 71.26; H, 6.98; N, 13.85. Found (percent): C, 70.82; H, 6.99; N, 13.64.

A solution of 2,3,4,5-tetrahydroazepino[2,3-b]indol-5a (1H)-ol in methanol was acidified with methanolic hydrogen chloride and the resulting salt was crystallized from methanol to give 2,3,4,5-tetrahydroazepino[2,3-b]indol-5a (1H)-ol hydrochloride of melting point 229.5–230.5° C. (dec.).

U.V.: λ max. 221, 224, 269, 278 and 299 mμ (ε 19,650; 19,700; 5700; 5550 and 4200 respectively) with an inflection at 293 mμ (ε 4150).

*Analysis.*—Calcd. for $C_{12}H_{15}ClN_2O$ (percent): C, 60.37; H, 6.33; Cl, 14.86; N, 11.74. Found (percent): C, 60.44; H, 6.63; Cl, 15.00; N, 11.52.

A solution of 2,3,4,5-tetrahydroazepino[2,3-b]indol-5a (1H)-ol in methanol was acidified with methanolic hydrogen bromide and the resulting salt was crystallized from methanol-ethyl acetate to give 2,3,4,5-tetrahydroazepino[2,3-b]indol - 5a(1H) - ol hydrobromide of melting point 205.5–206.5° C. (dec.).

U.V.: λ max. 219, 268, 278 and 290.5 mμ (ε 19,500; 5660; 5800 and 4360 respectively) with inflections at 223 and 300 mμ (ε 19,800 and 2560 respectively).

*Analysis.*—Calcd. for $C_{12}H_{15}BrN_2O$ (percent): C, 50.89; H, 5.34; Br, 28.22; N, 9.90. Found (percent): C, 50.82; H, 5.47; Br, 28.23; N, 10.14.

EXAMPLE 3

*1-acetyl-10-ethyl-1,2,3,4,5,10-hexahydroazepino[2,3-b] indole; 10-acetyl-1-ethyl-1,2,3,4,5,10,10a - hexahydroazepino[2,3-b]indol-5a(1H)-ol; 1 - acetyl-10-ethyl-2,3,4,5,10,10a-hexahydroazepino[2,3-b]indol - 5a(1H) - ol; 1,10 - diacetyl - 2,3,4,5,10,10a-hexahydroazepino[2,3-b]indol-5a(1H)-ol*

A mixture of 2,3,4,5-tetrahydroazepino[2,3-b]indol-5a (1H)-ol (7.00 g., 0.0346 mole), 10% palladium-on-carbon (3.5 g.) and acetic anhydride (700 ml.) was hydrogenated at an initial pressure of 30 p.s.i. for 8 hours and allowed to stand under hydrogen for an additional 16 hours. It was then filtered through Celite diatomaceous earth and the filtrate was concentrated in vacuo to give a residue. A solution of the residue in xylene was concentrated in vacuo to remove last traces of acetic anhydride and the residual oil was chromatographed on silica gel (400 g.); 70 ml. fractions were collected. Fractions 1–120 were eluted with 30% ethyl acetate–70% Skellysolve B hexanes and fractions 121–240 were eluted with ethyl acetate. The first compound was eluted in fractions 34–50 and was crystallized from ethyl acetate-Skellysolve B hexanes to give 0.658 g. of melting point 141–142.5° C.; 0.183 g. of melting point 140–142° C. and 0.053 g. of melting point 138.5–140.5° C. (10.8% yield) of 1-acetyl-10-ethyl-1,2,3,4,5,10-hexahydroazepino[2,3-b]indole. The analytical sample of melting point 140.5–141.5° C. was prepared by recrystallizing some of this material from ethyl acetate-Skellysolve B hexanes.

U.V.: λ max. 226, 284 and 293 mμ (ε 39,750; 9230 and 7870 respectively) with an inflection at 278 mμ (ε 8520).

*Analysis.*—Calcd. for $C_{16}H_{20}N_2O$ (percent: C, 74.96; H, 7.86. Found (percent): C, 74.89; H, 7.83.

The second compound was eluted in fractions 58–88 and was crystallized from ethyl acetate-Skellyslove B hexanes to give 2.30 g. of melting point 162.5–164° C., and 0.185 g. of melting point 161.5–162.5° C. (26.2% yield) of 10 - acetyl - 1-ethyl-2,3,4,5,10,10a-hexahydroazepino[2,3-b]indol-5a(1H)-ol. The analytical sample of melting point 164–165° C. was prepared by recrystallizing some of this material from ethyl acetate.

U.V.: λ max. 248 mμ (ε 13,900) and inflections at 278 and 286 mμ (ε 2460 and 1685 respectively).

*Analysis.*—Calcd. for $C_{16}H_{22}N_2O_2$ (percent): C, 70.04; H, 8.08; N, 10.21. Found (percent): C, 69.98; H, 8.21; N, 10.19.

The third compound was eluted from the column in fractions 152–164 and crystallized from ethyl acetate-Skellysolve B hexanes to give 0.261 g. of melting point 124–125° C. and 0.094 g. of melting point 117.5–119° C. (3.74%) of 1-acetyl-10-ethyl-2,3,4,5,10,10a-hexahydroazepino[2,3-b]indol-5a(1H)-ol. The analytical sample of melting point 111.5–112.5° C. was prepared by recrystallizing this material from ethyl acetate-Skellysolve B hexanes. The ultraviolet spectrum (ethanol) had λ max. 208, 251 and 309 mμ (ε 34,200; 13,840 and 2670 respectively).

*Analysis.*—Calcd. for $C_{16}H_{22}N_2O_2$ (percent): C, 70.04; H, 8.08; N, 10.21. Found (percent): C, 70.12; H, 8.22; N, 10.31.

The fourth compound was eluted in fractions 176–240 and was crystallized from methanol-ethyl acetate to give 2.58 g. (25.8%) of 1,10-diacetyl-2,3,4,5,10,10a-hexahydroazepino[2,3-b]indol-5a(1H)-ol of melting point 199–201° C. The analytical sample of melting point 200–201° C. was prepared by recrystallizing some of this material from methanol-ethyl acetate.

U.V.: λ max. 246, 278 and 287 mμ (ε 14,150, 2040 and 1600 respectively).

*Analysis.*—Calcd. for $C_{16}H_{20}N_2O_3$ (percent): C, 66.64; H, 6.99; N, 9.72. Found (percent): C, 66.31; H, 6.96; N, 9.55.

EXAMPLE 4

*1-acetyl-10-ethyl-1,2,3,4,5,10-hexahydroazepino-[2,3-b]indole*

A stirred mixture of 1-acetyl-10-ethyl-2,3,4,5,10,10a-hexahydroazepino[2,3-b]indol-5a(1H)-ol (81 mg., 0.295 mmole), p-toluenesulfonic acid (5 mg.) and benzene (10 ml.) was warmed under nitrogen to 80° C. during 20 minutes, then cooled and poured into ice water. This mixture was extracted with ether. The extract was dried over anhydrous magnesium sulfate and concentrated in vacuo. Crystallization of the residue from ethyl acetate-Skellysolve B hexanes gave 59 mg. (78%) of 1-acetyl-10-ethyl-1,2,3,4,5,10-hexahydroazepino[2,3-b]indole of melting point 140–141° C.

EXAMPLE 5

*1,10-diacetyl-1,2,3,4,5,10-hexahydroazepino-[2,3-b]indole*

A mixture of 1,10-diacetyl-2,3,4,5,10,10a-hexahydroazepino[2,3-b]indol-5a(1H)-ol (200 mg.; 0.694 mmole), p-toluenesulfonic acid (20 mg.) and benzene (30 ml.) was refluxed, under nitrogen, for 30 minutes. The cooled solution was washed with water and brine, dried over anhydrous magnesium sulfate and concentrated in vacuo to give a residue. Crystallization of the residue from ether gave 172 m. (91.7%) of 1,10-diacetyl-1,2,3,4,5,10-hexahydroazepino[2,3-b]indole of melting point 112–115.5° C. The analytical sample of melting point 113.5–115.5° C. was prepared by recrystallizing this material from ether.

U.V.: λ max. 243, 273, 293 and 302 mμ (ε 15,950; 10,150; 7000 and 6450 respectively).

*Analysis.*—Calcd. for $C_{16}H_{18}N_2O_2$ (percent): C, 71.09; H, 6.71; N, 10.36. Found (percent): C, 70.98; H, 6.58; N, 10.54.

EXAMPLE 6

*1-acetyl-1,2,3,4,5,10-hexahydroazepino[2,3-b]indole*

1,10 - diacetyl - 1,2,3,4,5,10-hexahydroazepino[2,3-b] indole (81 mg., 0.30 mmole) was added under nitrogen, to a solution of sodium (10 mg.) in absolute ethanol (3 ml.). The resulting solution was stirred for 44 minutes at ambient temperature and poured into water, a solid precipitated. This solid product was collected by filtration, washed with water, dried and recrystallized from ethyl acetate to give 53 mg. (77%) of 1-acetyl-1,2,3,4,5,10- hexahydroazepino[2,3-b]indole of melting point 192–193.5° C.

EXAMPLE 7

*1 - acetyl - 2,3,4,5-tetrahydroazepino[2,3-b]indol-5a(1H)-ol acetate ester; 2,3,4,5-tetrahydroazepino[2,3-b]indol-5a(1H)-ol acetate ester*

A stirred mixture of 2,3,4,5-tetrahydroazepino[2,3-b]-indol-5a(1H)-ol (1.02 g., 5.05 mmoles) (Example 2), acetic anhydride (3 ml.) and pyridine (50 ml.) was kept at ambient temperature, in the dark, under nitrogen, for 18 hours and concentrated in vacuo to give a residue. A solution of the residue in xylene was concentrated in vacuo to remove last traces of pyridine and acetic anhydride. The residue was chromatographed on silica gel 50 g).; 10 ml. fractions were collected. The first compound was eluted with 40% ethyl acetate-60% cyclohexane and was crystallized from ethyl acetate-Skellysolve B hexanes to give 0.377 g. (26.1%) of 1-acetyl-2,3,4,5 - tetrahydroazepino[2,3-b]indol-5a(1H)-ol acetate ester of melting point 127.5–128.5° C. The analytical sample of melting point 127.5–129° C., was prepared by recrystalling some of this material from ethyl acetate-Skellysolve B hexanes.

U.V.: λ max. 230, 287, 297 and 308 m$\mu$ (ε 20,100, 8310, 9720 and 9410 respectively).

*Analysis.*—Calcd. for $C_{16}H_{18}N_2O_3$ (percent): C, 67.11; H, 6.34; N, 9.78. Found (percent): C, 67.29; H, 6.79; N, 9.57.

The second compound was eluted from the column with 50% pyridine-ethyl acetate and was crystallized from methylene chloride-ethyl acetate to give 0.308 g. (25%) of 2,3,4,5 - tetrahydroazepino[2,3-b]indol - 5a(1H)-ol acetate ester of melting point 172–173° C. (dec.). The analytical sample of melting point 176° C. (dec.) was prepared by recrystallizing some of this material from methylene chloride-ethyl acetate.

U.V.: λ max. 282, 292 and 320 m$\mu$ (ε 10,200; 9190 and 3990 respectively).

*Analysis.*—Calcd. for $C_{14}H_{16}N_2O_2$ (percent): C, 68.83; H, 6.60; N, 11.47. Found (percent): C, 68.16; H, 6.67; N, 11.43.

EXAMPLE 8

*1-acetyl-1,2,3,4,5,10-hexahydrozepino[2,3-b]indole*

A mixture of 2,3,4,5-tetrahydroazepino[2,3-b]indol-5a(1H)-ol acetate ester (1.00 g., 4.09 mmoles), 10% palladium-on-carbon catalyst (0.5 g.) and acetic anhydride (100 ml.) was hydrogenated at an initial pressure of 30 p.s.i. for 8 hours, and filtered through Celite. The filtrate was concentrated in vacuo to give a residue. A solution of the residue in xylene was concentrated in vacuo to remove last traces of acetic anhydride. This residue was crystallized from ethyl acetate to give 0.362 g. of 1-acetyl-1,2,3,4,5,10-hexahydroazepino[2,3-b]indole of melting point 192–193.5° C.

EXAMPLE 9

*3,4-dihydro-9-methylcarbazol-1(2H)-one oxime*

A mixture of 3,4-dihydro-9-methylcarbazol-1(2H)-one (112.2 g., 0.563 mole), hydroxylamine hydrochloride (59.4 g.), anhydrous sodium acetate (76.6 g.), water (510 ml.) and ethanol (2100 ml.) was refluxed under nitrogen for 18 hours and cooled in an ice bath. The resulting crystalline product was collected by filtration, washed with water and dried to give 106.3 g. (87.9%) of 3,4-dihydro-9-methylcarbazol-1(2H)-one oxime of melting point 183–185° C.

EXAMPLE 10

*3,4-dihydro-9-methylcarbazol-1(2H)-one oxime p-toluenesulfonate*

A solution of 3,4-dihydro-9-methylcarbazol-1(2H)-one oxime (112.2 g., 0.524 mole) and p-toluenesulfonyl chloride (198 g., 1.05 mole) in pyridine (6 l.) was prepared at 0° C., stored under nitrogen at ambient temperature in the dark for 98 hours and poured into ice water (12 l.). This mixture was stirred for about 1 hour and the resulting crystalline product was collected by filtration, washed with water, dried and recrystallized from ethyl acetate-Skellysolve B hexanes to give 161.8 g. (84.1%) of 3,4-dihydro-9-methylcarbazol-1(2H)-one oxime p-toluenesulfonate of melting point 119.5–121.5° C. The analytical sample of melting point 120–121.5° C. was prepared by recrystallizing some of this material from ethyl acetate-Skellysolve B hexanes.

U.V.: λ max. 207, 226, and 310 m$\mu$ (ε 29,600; and 26,350 and 26,050 respectively) and inflections at 243, 274 and 345 m$\mu$ (ε 16,700; 3450 and 6500 respectively).

*Analysis.*—Calcd. for $C_{20}H_{20}N_2O_3S$ (percent): C, 65.19; H, 5.47; N, 7.60; S, 8.70. Found (percent): C, 65.15; H, 5.39; N, 7.64; S, 8.53.

EXAMPLE 11

*3,4,5,10-tetrahydro-10-methylazepino[2,3-b]indol-2(1H)-one*

A solution of 3,4-dihydro-9-methylcarbazol-1(2H)-one oxime p-toluenesulfonate (153.7 g., 0.417 mole) in benzene (1.5 l.) was absorbed on a column of neutral alumina (15 kg.) which had been deactivated with 0.4% water. The column was developed with 32 l. of benzene and eluted with 10 l. of chloroform followed by 25 l. of 20% methanol-80% chloroform. The combined product was chromatographed on silica gel (4.5 kg.) with 60% ethyl acetate-40% cyclohexane. The product obtained from this column was dissolved in methanol-ethyl acetate, decolorized with Darco G–60 activated charcoal and crystallized from ethyl acetate to give 20.6 g. (23.1%) of 3,4,5,10-tetrahydro-10-methylazepino[2,3-b]indol - 2(1H) - one of melting point 189–191° C. The analytical sample of melting point 193–194.5° C. was prepared by recrystallizing some of this material from ethyl acetate.

U.V.: λ max. 232 and 297 m$\mu$ (ε 30,500 and 13,800 respectively) with inflection at 211 and 292 m$\mu$ (ε 29,250 and 12,700 respectively).

*Analysis.*—Calcd. for $C_{13}H_{14}N_2O$ (percent): C, 72.87; H, 6.59; N, 13.08. Found (percent): C, 72.89; H, 6.58; N, 13.22.

EXAMPLE 12

*3,4,5,10-tetrahydro-10-methylazepino[2,3-b]indol-5a(2H)-ol hydrochloride*

3,4,5,10-tetrahydro - 10 - methylazepino[2,3-b]indol-2(1H)-one (17.7 g. 0.0824 mole) was added, under nitrogen, to an ice cold, stirred suspension of lithium aluminum hydride (18 g.) in tetrahydrofuran. The resulting mixture was refluxed for 18 hours, cooled in an ice bath and treated successively with water (18 ml.), 15% aqueous sodium hydroxide (18 ml.) and water (54 ml.). This mixture was stirred for 1.5 hours and filtered. The filtrate was concentrated under reduced pressure. An ethyl acetate solution of the residue was allowed to stand at ambient temperature for 3 hours and was then cooled in an ice bath and acidified with methanolic hydrogen chloride giving a precipitate. The precipitate was collected by filtration and dried to give 14.7 g. (70.6%) of 3,4,5,10-tetrahydro-10-methylazepino[2,3-b]indol - 5a(2H) - ol hydrochloride of melting point 268–269° C. The analytical sample of melting point 264.5–265° C. was prepared by recrystallizing some of this material from methanol-ethyl acetate.

U.V.: λ max. 219, 271, 278 and 296 m$\mu$ (ε 20,550; 5930; 5810 and 4120 respectively) with an inflection at 222 m$\mu$ (ε 20,000).

*Analysis.*—Calcd. for $C_{13}H_{17}ClN_2O$ (percent): C, 61.77; H, 6.78; Cl, 14.03; N, 11.09. Found (percent): C, 61.69; H, 6.91; Cl, 14.05; N, 11.12; $H_2O$, <0.1.

EXAMPLE 13

*Hydrogenation of 3,4,5,10-tetrahydro-10-methylazepino-[2,3-b]indol-5a(2H)-ol in acetic anhydride with palladium*

A solution of 3,4,5,10-tetrahydro-10-methylazepino-[2,3-b]indol-5a(2H)-ol hydrochloride in water was cooled in an ice bath, made alkaline with sodium hydroxide and extracted with ether. The extract was washed with brine, dried over anhydrous potassium carbonate and concentrated in vacuo. The residue was crystallized from ethyl acetate to give 3,4,5,10-tetrahydro-10-methylazepino [2,3-b]indol-5a(2H)-ol of melting point 129–133° C. (If necessary, this material may be purified by chromatography on silica gel with 2% triethylamine-2.5% methanol-95.5% ethyl acetate.)

U.V.: λ max. 217 and 277 mμ (ε 24,050 and 13,650 respectively) with an inflection at 302 mμ (ε 2700).

*Analysis.*—Calcd. for $C_{13}H_{16}N_2O$ (percent): C, 72.19; H, 7.46; N, 12.95. Found (percent): C, 71.83; H, 7.78; N, 12.75.

A mixture of 3,4,5,10 - tetrahydro - 10 - methylazepino[2,3-b]indol-5a(2H)-ol (5.00 g., 0.0231 mole), 10% palladium-on-carbon catalyst (2.5 g.) and acetic anhydride (500 ml.) was hydrogenated at an initial pressure of 30 p.s.i. for 8 hours and allowed to stand under hydrogen without shaking for an additional 16 hours. The catalyst was removed by filtration through Celite diatomaceous earth; the solid was washed with ethyl acetate and the combined filtrate was concentrated in vacuo. The residue was dissolved in xylene and concentrated to remove last traces of acetic anhydride. This residue was chromatographed on silica gel (250 g.) 50 ml. fractions were collected. Fractions 1–13 were eluted with 30% ethyl acetate-70% cyclohexane and fractions 14–72 with ethyl acetate.

The first compound was eluted in fractions 5–7. A solution of this material in ethyl acetate was acidified with methanolic hydrogen chloride and the salt was crystallized from ethanol-ethyl acetate to give 1.12 g. of melting point 211–212° C. (dec.) and 0.344 g. of melting point 207.5–208.5° C. (23.9% yield) of 1-ethyl-1,2,3,4,5,10-hexahydro - 10 - methylazepino[2.3 - b]indole hydrochloride. The analytical sample of melting point 209–210° C. (dec.) was prepared by recrystallizing this material from ethanolethyl acetate.

U.V.: λ max. 219, 276 and 283 mμ (ε 17,700; 8550 and 8700 respectively) with an inflection at 293 mμ (ε 7650).

*Analysis*—Calcd. for $C_{15}H_{21}ClN_2$ (percent): C, 68.03; H, 7.99; Cl, 13.39; N, 10.58. Found (percent): C, 67.73; H, 7.89; Cl, 13.46; N, 10.10.

A 0.5 g. sample of the hydrochloride was treated with sodium carbonate in water until the reaction mixture was basic. The mixture was then extracted with methylene chloride, the methylene chloride extracts evaporated to give the free base, 1-ethyl-1,2,3,4,5,10-hexahydro-10-methylazepino[2,3-b]indole.

The second compound was eluted from the column in fractions 12–15 and was crystallized from ethyl acetate-Skellysolve B hexanes to give 1.43 g. (25.4%) of 1-acetyl-1,2,3,4,5,10 - hexahydro - 10 - methylazepino[2,3 - b] indole of melting point 130–132.5° C. The analytical sample of melting point 125–125.5° C. was prepared by recrystallizing some of this material from ethanol-Skellysolve B hexanes.

U.V.: λ max. 226, 285 and 293 mμ (ε 40,000; 9290 and 8100 respectively (with an inflection at 279 (ε 8560).

*Analysis*—Calcd. for $C_{15}H_{18}N_2O$ (percent): C, 74.35; H, 7.49; N, 11.56. Found (percent): C, 74.60; H, 7.54; N, 11.48.

Further elution of the column (fractions 35-63) gave two additional compounds which were poorly separated. This material was thus combined and rechromatographed on silica gel (150 g.) with 2% triethylamine-23% cyclohexane-75% ethyl acetate. The first compound eluted from this column was crystallized from ethyl acetate-Skellysolve B hexanes to give 0.408 g. (6.87%) of 3,4,5,10 - tetrahydro - 10 - methylazepino[2,3 - b]indol-5a(2H)-ol acetate ester of melting point 108.5–110° C. The analytical sample of melting point 105–108° C. was prepared by recrystallizing some of this material from ethyl acetate-Skellysolve B.

U.V.: λ max. 217, 277 and 311 mμ (ε 23,430; 15,070 and 2450 respectively).

*Analysis*—Calcd. for $C_{15}H_{18}N_2O_2$ (percent): C, 69.74; H, 7.02; N, 10.85. Found (percent): C, 69.61; H, 7.04; N, 10.36.

The second compound eluted from the column was crystallized from ethyl acetate-Skellysolve B (Darco) to give 0.169 g. (2.81%) of 1-acetyl-2,3,4,5,10,10a-hexahydro-10-methylazepino[2,3-b]indol-5a(1H)-ol of melting point 139–141° C. The analytical sample of melting point 141.5–142.5° C. was prepared by recrystallizing this material from ethyl acetate-Skellysolve B hexanes.

U.V.: λ max. 250 and 306 mμ (ε 12,950 and 2625 respectively).

*Analysis*—Calcd. for $C_{15}H_{20}N_2O_2$ (percent): C, 69.20; H, 7.74; N, 10.76. Found (percent): C, 68.96; H, 7.86; N, 10.71.

I claim:
1. A compound of the formula

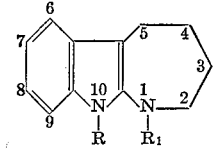

(XX)

wherein R is selected from the group consisting of hydrogen, methyl, ethyl and acetyl and wherein $R_1$ is selected from the group consisting of ethyl and acetyl with the proviso that when R is hydrogen, $R_1$ is acetyl and the pharmacologically acceptable acid addition salts thereof.

2. The compound of claim 1 wherein R is hydrogen and $R_1$ is acetyl and which is therefore 1-acetyl-1,2,3,4,5,10-hexahydroazepino[2,3-b]indole.

3. The compound of claim 1 wherein R is ethyl and $R_1$ is acetyl and which is therefore 1-acetyl-10-ethyl-1,2,3,4,5,10-hexahydroazepino[2,3-b]indole.

4. The compound of claim 1, wherein R and $R_1$ are acetyl and the compound is therefore 1,10-diacetyl-1,2,3,4,5,10-hexahydroazepino[2,3-b]indole.

5. The compound according to claim 1 as a hydrochloride wherein R is methyl and $R_1$ is ethyl and which is therefore 1 - ethyl - 1,2,3,4,5,10 - hexahydro - 10-methylazepino[2,3-b]indole hydrochloride.

6. The compound according to claim 1 wherein R is methyl and $R_1$ is acetyl and which is therefore 1-acetyl-1,2,3,4,5,10-hexahydro-10-methylazepino[2,3-b]indole.

7. A process for the production of 1-acetyl-1,2,3,4,5,10-hexahydroazepino[2,3-b]indole which comprises: reducing 2,3,4,10 - tetrahydroazepino[2,3-b]indol - 2(1H)-one with lithium aluminum hydride and treating the reduction product with acetic anhydride in pyridine to obtain 1 - acetyl - 1,2,3,4,5,10 - hexahydroazepino[2,3 - b] indole.

8. A process for the production of 1-acetyl-1,2,3,4,5,10-hexahydro - 10 - ethylazepino[2,3 - b]indole which comprises: reducing 3,4,5,10 - tetrahydroazepino[2,3 - b] indol - 2(1H) - one with lithium aluminum hydride and permitting the resulting product to react with oxygen to obtain 2,3,4,5 - tetrahydroazepino[2,3 - b]indol - 5a(1H)-ol (IV); reducing IV with hydrogen in the presence of a palladium-on-charcoal catalyst in acetic anhydride 1-acetyl - 1,2,3,4,5,10 - hexahydro - 10 - ethylazepino[2,3 - b] indole (V), 10 - acetyl - 2,3,4,5,10,10a - hexahydro - 1-ethylazepino[2,3 - b]indol - 5a(1H) - ol (VI), 1 - acetyl - 2,3,4,5,10,10a - hexahydro - 10 - ethylazepino[2,3-b] indol - 5a(1H) - ol (VII) and 1,10 - diacetyl - 2,3,4,5,10, 10a - hexahydroazepino[2,3 - b]indol - 5a(1H) - ol (VIII), and separating by chromatography V from the other products.

9. A process for the production of 1,10 - diacetyl-1,2,3,4,5,10 - hexahydroazepino[2,3 - b]indole (IX) which comprises reducing 3,4,5,10 - tetrahydroazepino[2,3 - b]indol - 2(1H) - one with lithium aluminum hydride and permitting the resulting product to react with oxygen to obtain 2,3,4,5 - tetrahydroazepino[2,3-b]indol - 5a(1H) - ol (IV); reducing IV with hydrogen in the presence of a palladium-on-charcoal catalyst in acetic anhydride to obtain 1,10 - diacetyl - 2,3,4,5,10,10a-hexahydroazepino[2,3 - b]indol - 5a(1H) - ol (VIII), 10 - acetyl - 2,3,4,5,10,10a - hexahydro - 1 - ethylazepino[2,3 - b]indol - 5a(1H) - ol (VI), 1 - acetyl - 2,3,4,5,10, 10a - hexahydro - 10 - ethylazepinol[2,3-b]indol-5a(1H)- ol (VIII) and 1 - acetyl - 1,2,3,4,5,10 - hexahydro-10 - ethylazepino[2,3 - b]indole (V), and separating by chromatography VIII from the other products, and dehydrating VIII with toluene-sulfonic acid to obtain compound IX of above.

References Cited

UNITED STATES PATENTS 3,419,569  12/1968  Renner.

ALEX MAZEL, Primary Examiner

J. A. NARCAVAGE, Assistant Examiner

U.S. Cl. X.R.

71—95; 260—326.3, 326.9; 424—274

UNITED STATES PATENT OFFICE
CERTIFICATE OF CORRECTION

Patent No. 3,573,323         Dated   March 30, 1971

Inventor(s)   Jackson B. Hester, Jr.

It is certified that error appears in the above-identified patent and that said Letters Patent are hereby corrected as shown below:

Column 4, line 1, for "methanesulfonates" read -- methanesulfonate --; line 8, for "4," read -- 4, --. Column line 7, for (1H)-on" read -- (1H)-one --. Column 6, line 52, for "infection" read -- inflection --. Column 8, line 56, fc "172 m." read -- 172 mg. --. Column 10, line 41, for "inflect read -- inflections --. Column 11, line 67, for "respectivel read -- respectively) --. Column 12, line 70, for "anhydride 1-acetyl-" read -- anhydride to obtain 1-acetyl- --. Column line 16, for "ethylazepinol" read -- ethylazepino --.

Signed and sealed this 14th day of December 1971.

(SEAL)
Attest:

EDWARD M. FLETCHER, JR.
Attesting Officer

ROBERT GOTTSCHALK
Acting Commissioner of Pate